US007499793B2

(12) United States Patent
Fayyad et al.

(10) Patent No.: US 7,499,793 B2
(45) Date of Patent: Mar. 3, 2009

(54) SYSTEM FOR DISCRIMINATION OF SPURIOUS CRANK ENCODER SIGNALS

(75) Inventors: Salem A. Fayyad, Grand Blanc, MI (US); Andy Tenka, Ypsilanti, MI (US)

(73) Assignee: Delphi Technologies, Inc., Troy, MI (US)

( * ) Notice: Subject to any disclaimer, the term of this patent is extended or adjusted under 35 U.S.C. 154(b) by 101 days.

(21) Appl. No.: 11/803,327

(22) Filed: May 14, 2007

(65) Prior Publication Data

US 2008/0288154 A1 Nov. 20, 2008

(51) Int. Cl.
*G06F 17/00* (2006.01)
*B60T 7/70* (2006.01)
*G01M 15/00* (2006.01)

(52) U.S. Cl. .................... 701/114; 701/102; 73/114.04

(58) Field of Classification Search ................ 701/101, 701/102, 111, 114, 115; 73/35.01, 35.02, 73/35.03, 35.04, 35.05, 35.06, 114.04, 114.05, 73/114.22, 114.25, 114.26; 123/399
See application file for complete search history.

(56) References Cited

U.S. PATENT DOCUMENTS

| | | | | |
|---|---|---|---|---|
| 4,584,978 | A * | 4/1986 | Sasaki et al. | 123/406.65 |
| 5,132,909 | A * | 7/1992 | Schroeder et al. | 701/101 |
| 5,636,620 | A * | 6/1997 | Kiess et al. | 123/625 |
| 5,806,014 | A * | 9/1998 | Remboski et al. | 701/111 |
| 6,484,694 | B2 * | 11/2002 | Thomas | 123/435 |
| 6,546,328 | B1 * | 4/2003 | Slicker | 701/111 |
| 7,027,907 | B2 * | 4/2006 | Le Gall et al. | 701/105 |
| 7,110,874 | B1 * | 9/2006 | Kabele | 701/101 |
| 7,142,975 | B2 * | 11/2006 | Wang et al. | 701/114 |
| 7,234,442 | B2 * | 6/2007 | Hanson et al. | 123/332 |
| 7,369,934 | B2 * | 5/2008 | Chatfield et al. | 701/104 |
| 7,415,347 | B2 * | 8/2008 | Naber et al. | 701/111 |

* cited by examiner

*Primary Examiner*—Willis R. Wolfe, Jr.
*Assistant Examiner*—Johnny H. Hoang
(74) *Attorney, Agent, or Firm*—Paul L. Marshall

(57) ABSTRACT

A system for discrimination of spurious crankshaft encoder signals. A position encoder connected to an engine crankshaft sends a pulsed signal indicative of crankshaft rotational performance to an engine controller. The controller is programmed to trigger an interrupt service routine (ISR) on every falling or rising edge of each pulse. The ISR calculates and stores the period of each pulse and the period of the previous pulse and calculates the rotational speed and instantaneous acceleration or deceleration of the engine at all times. The controller is further programmed with realistic engine acceleration and deceleration limits and recognizes a next signal only within a time window corresponding to those limits and the engine speed. Signals arriving outside the calculated time window are considered spurious and are rejected. The system improves engine performance by preventing loss of synchronization between spark and fuel injection and piston and valve timing.

3 Claims, 3 Drawing Sheets

SYSTEM FOR DISCRIMINATION OF SPURIOUS CRANK ENCODER SIGNALS

TECHNICAL FIELD

The present invention relates to operational controls for internal combustion engines; more particularly, to spark and fuel delivery timing based upon signals from a crankshaft rotary position encoder; and most particularly, to a system for improving the reliability of such signals by discrimination of spurious electrical noise spikes.

BACKGROUND OF THE INVENTION

It is well known in the engine arts to control the firing and/or fuel injection timing of an internal combustion engine by use of a rotary signal encoder driven by the engine's crankshaft. Such an encoder typically employs a beam or field chopper such as a toothed wheel to generate an alternating signal indicative of the instantaneous rotational position and rotational speed of the crankshaft. A typical crank wheel chopper has 58 peripheral teeth comprising a 50% duty cycle (teeth and gaps of equal angular length). A timing gap equivalent to about three teeth is also included to permit the system to recognize the completion of each revolution and the start of the next revolution.

A problem in the prior art is that electrical noise in the engine, which may arise from any of a variety of sources, may interrupt and distort the true signal, either in the timing gap or between true teeth signals, producing signal spikes which are interpreted by the engine controller as valid. The controller then counts 59 (or more) teeth in a revolution, which cannot be computed by the prior art timing algorithm. This causes loss of synchronization of firing and/or fuel injection with the piston and valve sequencing, which can result in misfiring and incorrect spark and fuel delivery.

What is needed in the art is a system (method and apparatus) for recognizing and rejecting such spurious signals by continuing analysis of the true signal.

It is a principal object of the present invention to improve performance of an internal combustion engine by increasing the reliability of a crank encoder signal.

SUMMARY OF THE INVENTION

Briefly described, a system for discrimination of spurious crank encoder signals in accordance with the invention comprises a position encoder attached to an engine crankshaft and an engine controller for receiving an interrupted signal from the encoder, preferably a signal chopped by a toothed wheel. The controller is programmed to trigger an interrupt service routine (ISR) on every falling or rising edge of each tooth. The ISR calculates and stores the period of each tooth interruption and the period of the previous tooth interruption and therefore can calculate the instantaneous acceleration or deceleration of the engine at all times. The controller is further programmed with realistic engine acceleration and deceleration limits and recognizes a next signal only within a time window corresponding to those limits. Signals received outside the calculated time window are mechanically impossible as true signals and thus are considered spurious and are rejected.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
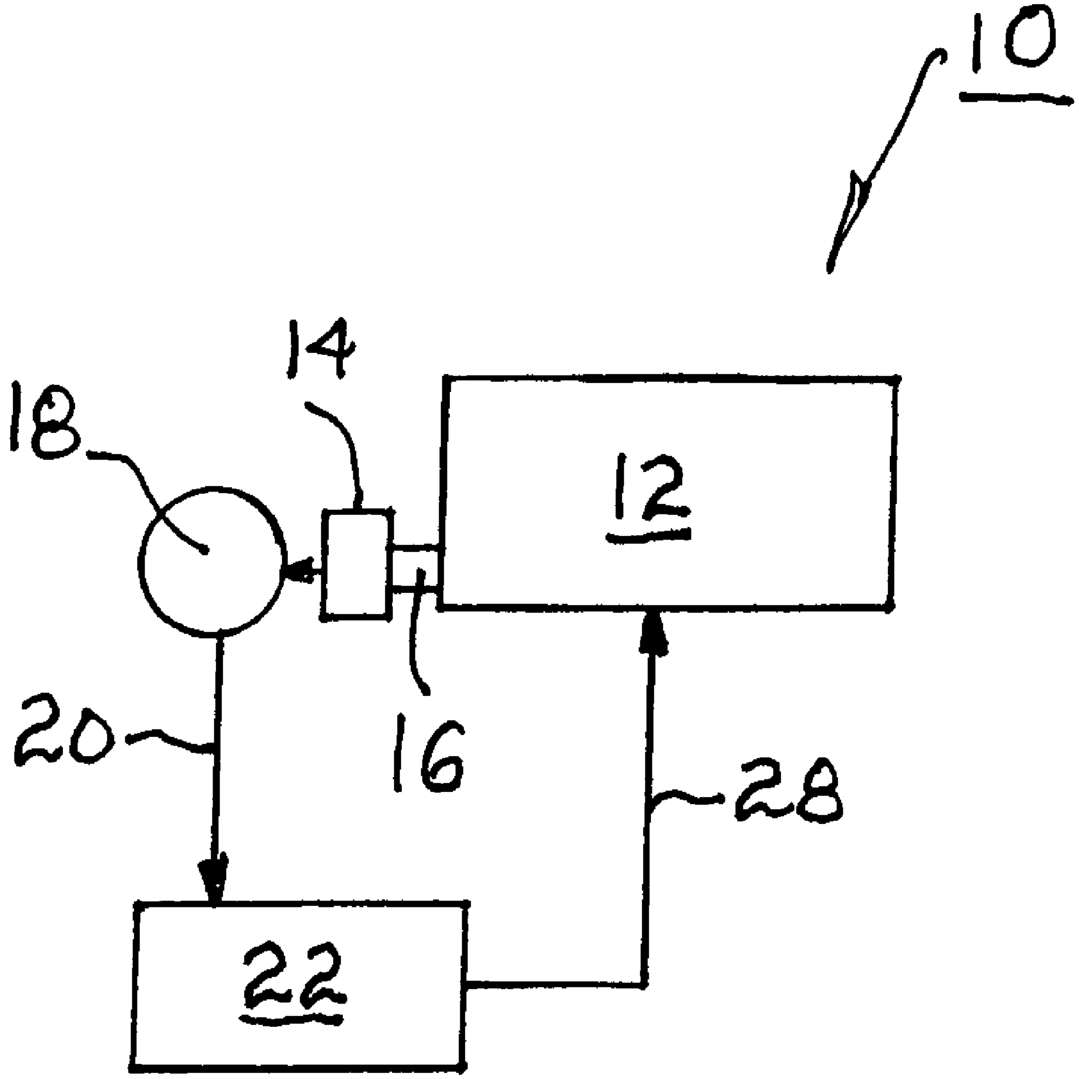
FIG. 1 (PRIOR ART)
FIG. 1 is a schematic drawing of a prior art engine timing control system.
Figure 2:
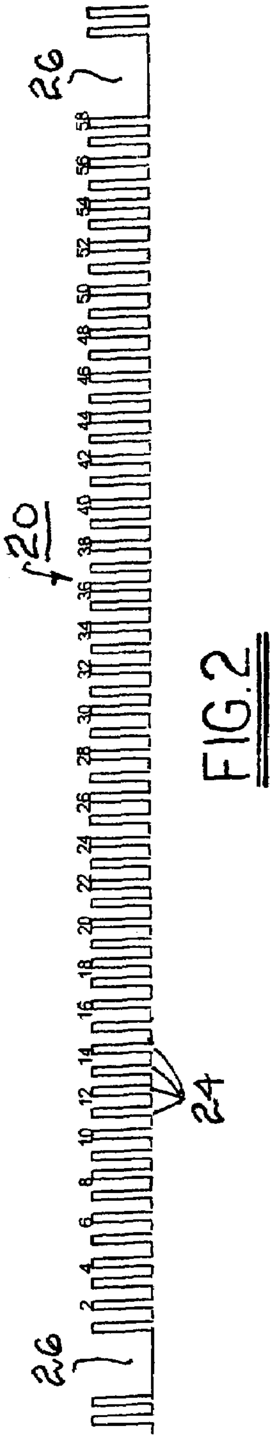
FIG. 2 (PRIOR ART)
FIG. 2 is a typical prior art signal from a 58-tooth crankshaft position encoder.

Referring to FIGS. 1 and 2, a typical prior art engine timing control system 10 for controlling the timing of spark firing (in spark-ignited internal combustion engines) and the timing of fuel injection comprises an engine 12 having a target wheel 14 mounted for rotation with the engine's crankshaft 16. An electronic encoder 18 senses the rotation of crankshaft 16 and target wheel 14 and sends a signal 20 to an engine control module (ECM) 22. ECM 22 counts the pulses 24 in signal 20 between timing gaps 26, and from these infers the instantaneous rotational position of the crankshaft at any moment. ECM 22 applies the inferred position to send appropriate timing signals 28 to engine 12 governing fuel injection and/or spark ignition to each cylinder thereof. As shown in FIG. 2, a typical and exemplary prior art encoder 18 generates of a square wave signal 20 comprising 58 pulses 24 and a timing gap 26 for each revolution of crankshaft 16.

Figure 3:
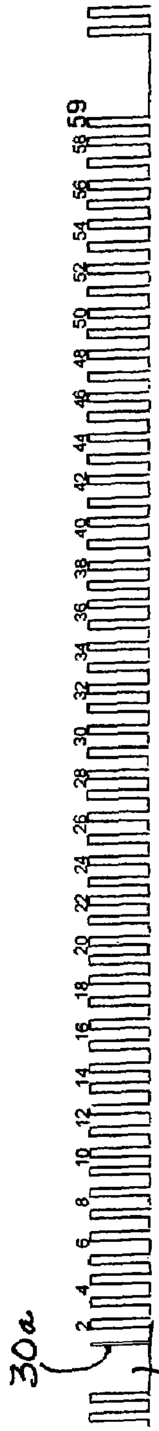
FIG. 3 (PRIOR ART)
FIG. 3 is a prior art signal like that shown in FIG. 2, showing a spurious additional signal in the timing gap.
Figure 4:
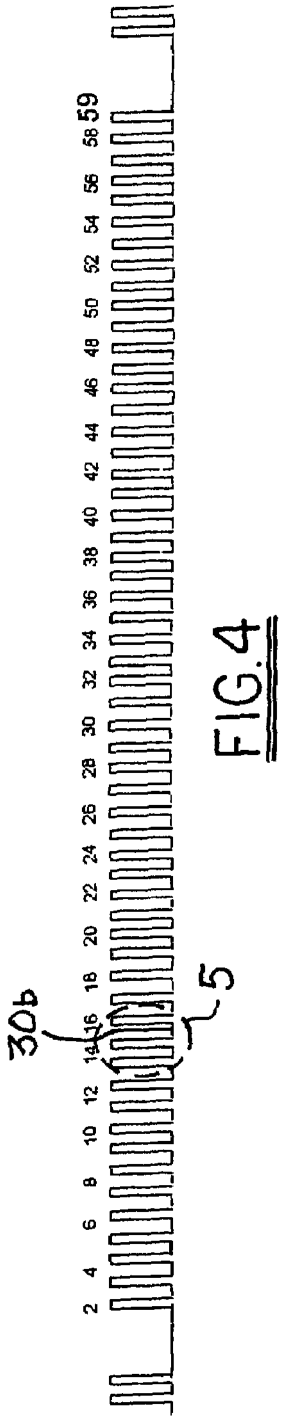
FIG. 4 (PRIOR ART)
FIG. 4 is a prior art signal like that shown in FIG. 2, showing a spurious additional signal within the 58-tooth signal trace.

Referring to FIGS. 3 and 4, as described above, prior art system 10 is vulnerable to spurious electrical noise signals that serve to increase the apparent number of pulses per revolution. In FIG. 3, a spurious pulse **30*a* is shown occurring within gap 26, thus beginning prematurely the counting of pulses for this revolution, and resulting in 59 pulses per revolution. In FIG. 4, a spurious pulse 30*b* is shown occurring within the pulse train between true pulse numbers 14 and 15, again resulting in 59 pulses per revolution. In either of these cases, the synchronization of timing signals 28 for fuel injection and spark ignition with respect to the valves and pistons within engine 12** is erroneous. Obviously, any number of spurious pulses can occur during any given revolution, further degrading timing synchronization.

Figure 5:
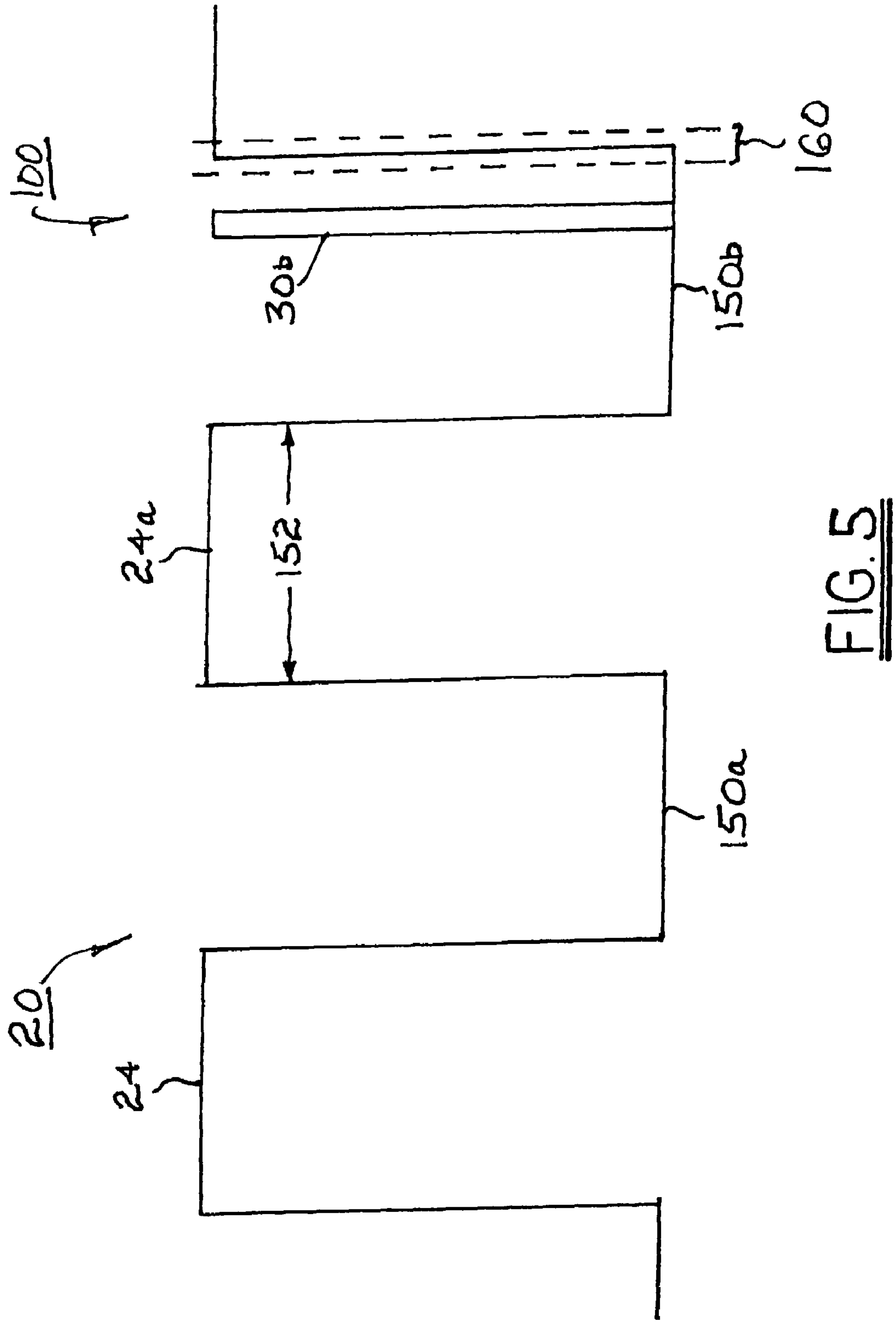
FIG. 5 is a detailed view taken at circle 5 in FIG. 4, showing an exclusionary timing window provided in accordance with the invention.

Referring to FIG. 5, a system 100 for discrimination of spurious crank encoder signals, for example 30b, in accordance with the invention comprises an improvement in the algorithm by which ECM 22 generates signals 28. ECM 22 observes and computes from the encoder pulse train 20 the period **150*a* between the crank wheel pulses 24 and creates a profile of an expected tooth period 150*b* for the next crank tooth pulse. ECM 22 further applies a calculation to the length 152 of the most recent tooth pulse 24*a* to arrive at an expected engine acceleration or deceleration, and therefore, an expected time window 160 for arrival of the next encoder pulse. The width of time window 160 is also limited by the known maximum rate at which engine 12 can accelerate or decelerate between successive pulses. Noise pulses, such as pulse 30*b*, that occur outside any window of expectation 160** are not recognized as a valid encoder signal and are excluded from the analysis of the crank signal profile for timing of fuel and spark delivery by signals 28.

A method in accordance with the invention comprises the following steps:

a) triggering an interrupt service routine (ISR) on every falling or rising edge of each encoder tooth;

b) calculating and storing the period of interrupt by each successive tooth and the period of interrupt of the immediately previous tooth;

c) comparing the adjacent periods of interrupt to calculate engine speed and an instantaneous rate of acceleration or deceleration of the engine;

d) using the calculated rate of engine acceleration or deceleration and the engine speed to calculate a predicted time window for reception of the next encoder signal;

e) receiving a signal within the predicted time window; and f) rejecting as spurious any signal received outside the predicted time window.

Preferably, the controller algorithm also includes means for recognizing and rejecting a repeating signal anomaly such as would arise from a bad tooth on the encoder.

Advantages of a system in accordance with the invention are:

a) reduced occurrences of engine misfire;

b) a potential reduction in the crank-to-run time interval, provided by removing crank sensor noise during engine cranking;

c) more accurate spark delivery, by compensating for noise spikes in spark delivery and dwell;

d) more accurate engine speed calculation, resulting in more accurate fuel delivery calculation; and e) reduced emissions.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for discrimination of spurious crank encoder signals in an internal combustion engine, comprising:

a) a crankshaft position encoder for generating a pulsed signal indicative of rotational performance of said crankshaft; and b) an engine controller for receiving said pulsed signal from said encoder and for generating signals controlling engine functions including but not limited to spark and fuel injection timing, wherein said controller computes from said encoder generated signals a period between a first pulsed signal and a second pulsed signal indicative of engine speed, applies a calculation to determine a rate of engine acceleration/deceleration, calculates an expected time window for receiving a third pulsed signal, recognizes said third pulsed signal that arrives within the expected time window, and rejects said third pulsed signal that arrives outside the expected time window.

2. A method for discrimination of spurious crankshaft encoder signals in an internal combustion engine having a crankshaft and a target wheel mounted for rotation with said crankshaft, said target wheel having a predetermined number of spaced apart teeth, each tooth having a rising edge and falling edge, said engine further having a crankshaft position encoder for generating a pulsed signal indicative of rotational performance of the crankshaft, and an engine controller for receiving the pulsed signal from the encoder and for controlling the timing of engine functions including but not limited to spark and fuel injection timing, the method comprising the following steps:

a) triggering an interrupt service routine that generates a pulsed signal from every falling and rising edge of each tooth;

b) calculating and storing a period of interrupt from each successive pulsed signal;

c) comparing the periods of interrupt from successive pulsed signals to calculate engine speed and an instantaneous rate of acceleration or deceleration of the engine;

d) using the calculated rate of engine acceleration or deceleration and the engine speed to calculate a predicted a time window for reception of the next successive pulsed signal;

e) recognizing a next successive pulsed signal arriving within the predicted time window; and f) rejecting as spurious a next successive pulsed signal arriving outside the predicted time window.

3. A method in accordance with claim 2 comprising the further step of regulating the timing of spark and fuel injection in said engine in response to said received signal from said encoder.

* * * * *